Sept. 1, 1964　　　　　J. H. MORAN　　　　　3,147,429
INDUCTION METHOD AND APPARATUS FOR INVESTIGATING
EARTH FORMATION UTILIZING TWO QUADRATURE PHASE
COMPONENTS OF A DETECTED SIGNAL
Filed Feb. 8, 1960　　　　　　　　　　　　4 Sheets-Sheet 2

James H. Moran
INVENTOR.

BY Richard E. Bee

ATTORNEY

Fig. 4

United States Patent Office 3,147,429
Patented Sept. 1, 1964

3,147,429
INDUCTION METHOD AND APPARATUS FOR INVESTIGATING EARTH FORMATION UTILIZING TWO QUADRATURE PHASE COMPONENTS OF A DETECTED SIGNAL
James H. Moran, Danbury, Conn., assignor to Schlumberger Well Surveying Corporation, Houston, Tex., a corporation of Texas
Filed Feb. 8, 1960, Ser. No. 7,315
21 Claims. (Cl. 324—6)

This invention relates to electrical methods and apparatus for investigating subsurface earth formations traversed by a borehole and, particularly, to such methods and apparatus of the induction logging type wherein a coil system is utilized to investigate the electrical resistance properties of such subsurface formations.

Induction logging investigations of a borehole drilled into the earth are made by moving a suitable coil system through the borehole. Such a coil system commonly includes one or more transmitter coils and one or more receiver coils, the coils being mounted on a suitable support member in a fixed spatial relationship relative to one another. The transmitter coil or coils are energized with alternating current to induce a secondary current flow in the adjacent formation material. The electromagnetic field resulting from this secondary current flow induces a voltage signal in the receiver coil or coils. This voltage signal varies in accordance with the conductivity value of the formation material. This voltage signal is recorded by suitable recording apparatus for providing a continuous record or log of the conductivity values as a function of borehole depth.

Induction logging systems of this type are discussed in greater detail in a technical paper by H.G. Doll, entitled "Introduction to Induction Logging and Application to Logging of Wells Drilled With Oil Base Mud," which appeared in the June 1949 issue of the Journal of Petroleum Technology. As discussed in this technical paper, if the proper precautions are taken, then the coil system output signal is directly and linearly proportional to the electrical conductivity of the formation material over most of the range of formation conductivity values usually encountered.

Since the publication of this technical paper and after further extensive theoretical studies and practical applications, a better understanding has been obtained of the various mechanisms and effects that occur in such induction logging systems. In particular, it has been found that certain nonlinear effects may, under the proper conditions, become of sufficient magnitude to noticeably affect the coil system output signal and cause such signal to vary in a nonlinear manner with respect to formation conductivity values. These nonlinear effects are caused by the so-called electrical "skin effect" phenomena. This skin effect phenomena results primarily from the mutual interaction with one another of different portions of the secondary current flow in the formation material. The magnitude of this skin effect phenomena increases as the coil system operating frequency increases. It is the same type of phenomena that has been heretofore encountered in the high frequency operation of other types of electrical circuits and devices.

In the case of borehole induction logging apparatus, it has been found that, among other things, the magnitude of this skin effect phenomena is a complex and complicated function of the coil system operating frequency, the effective length of the coil system, and the conductivity value of the adjacent formation material. The last-mentioned factor renders this phenomena particularly objectionable because it tends to produce an extraneous nonlinear variation in the output signal. The occurrence of these nonlinear variations can be substantially eliminated for a large range of formation conductivity values by proper choice of the coil system operating frequency and the effective coil system length. This, however, places undue restraints on the construction and operation of the coil system and associated circuits. This, in turn, limits other desirable features of the coil system apparatus. For example, it is frequently desired that the coil system be able to accurately determine the conductivity value of the formation material in a region lying at a substantial lateral distance from the borehole. This requires a relatively large coil spacing or coil system length. A large spacing, however, increases the percentage of nonlinearity resulting from the occurrence of skin effect. As another example of undesirable restraint, the signal-to-noise ratio of the apparatus can be improved by increasing the operating frequency thereof. This, however, also increases the skin effect nonlinearity.

In general, therefore, it would be desirable to have some further and independent method for correcting or minimizing skin effect nonlinearity. In addition to allowing greater freedom in coil system construction, this would increase the accuracy and reliability of induction logging systems generally. It would further provide more accurate measurements over a wider range of conductivity values.

It is an object of the invention, therefore, to provide new and improved induction logging methods and apparatus for measuring the electrical characteristics of subsurface earth formations adjacent to a borehole.

It is another object of the invention to provide new and improved induction logging methods and apparatus for minimizing skin effect nonlinearities.

It is a further object of the invention to provide new and improved induction logging methods and apparatus which allow a greater degree of freedom in the construction and operation of the apparatus.

It is an additional object of the invention to provide new and improved induction logging apparatus having a minimum of circuit complexity for developing an output signal which is more accurately proportional to the electrical conductivity of the adjacent formation material over a wider range of formation conductivity values.

In accordance with the invention, subsurface formation material adjacent to a borehole drilled into the earth is investigated by inducing a flow of alternating current in the formation material. An indication is then obtained of the magnitude of a given-phase component of the electromagnetic field produced by this current flow. A further indication is also obtained of the magnitude of a quadrature phase component of this electromagnetic field. The given-phase magnitude indication is then modified by the quadrature-phase magnitude indication to provide an improved indication of an electrical characteristic material.

Induction logging apparatus constructed in accordance with the present invention for investigating earth formations in this manner comprises a coil system adapted for movement through the bore. Such apparatus further includes means for energizing the coil system with alternating current to develop a signal which is dependent on the electrical characteristics of the adjacent formation material. The apparatus also includes first phase sensitive circuit means coupled to the coil system for developing a signal representative of the magnitude of a given phase component of the coil system signal. In addition, the apparatus includes second phase sensitive circuit means coupled to the coil system for developing a signal representative of the magnitude of a quadrature phase component of the coil system signal. The apparatus further includes means for modifying the given phase magnitude signal by the quadrature-phase magnitude signal for developing an output signal which provides an improved indication of an electrical characteristic of the adjacent formation material.

For a better understanding of the present invention, together with other and further objects thereof, reference is had to the following description taken in connection with the accompanying drawings, the scope of the invention being pointed out in the appended claims.

Referring to the drawings.

Figure 1:
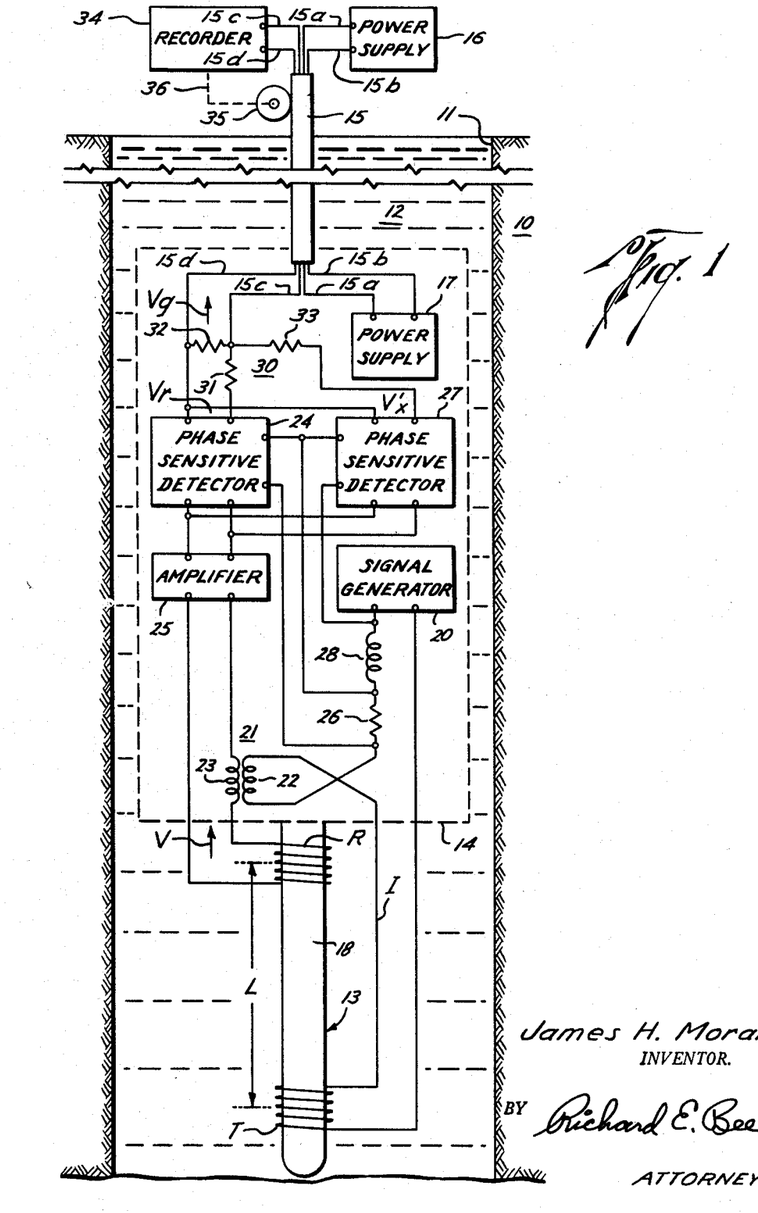
FIG. 1 illustrates in a partially schematic manner a representative embodiment of induction logging apparatus constructed in accordance with the present invention.

Referring to FIG. 1 of the drawings, there is shown a representative embodiment of induction logging apparatus constructed in accordance with the present invention for investigating earth formations 10 traversed by a borehole 11. The borehole 11 is usually filled with a drilling liquid or drilling mud 12. The downhole portion of the induction logging apparatus includes a coil system 13 adapted for movement through the borehole 11. The downhole apparatus also includes a fluid-tight instrument housing 14 mechanically attached to the upper end of the coil system 13 for containing the electrical circuits which operate the coil system 13. The instrument housing 14 is, in turn, suspended from the surface of the earth by an armored multiconductor cable 15. A suitable drum and winch mechanism (not shown) is located at the surface of the earth for moving the downhole apparatus through the borehole by raising and lowering the cable 15. Also located at the surface of the earth is a power supply 16 for supplying electrical operating energy by way of cable conductors 15a and 15b to a downhole power supply 17 contained within the instrument housing 14. The downhole power supply 17 serves to supply the requisite operating voltages to the various downhole electrical circuits. For sake of simplicity, the power supply interconnections have been omitted.

Considering the coil system 13 in greater detail, such coil system includes a transmitter coil T and a receiver coil R. Both of these coils are wound around a nonconductive, non-magnetic support member 18 so that their center axes are in line with one another and generally parallel to the longitudinal axis of the borehole 11. The longitudinal midpoints of these coils are separated by a distance "L."

The apparatus of the present invention also includes means for energizing the coil system 13 with alternating current to develop a signal which is dependent on the electrical characteristics of the adjacent earth formation material. In the present embodiment, this energizing means includes a signal generator 20 for supplying to the transmitter coil T an alternating current I of constant amplitude and constant frequency. The flow of this alternating current I in the transmitter coil T serves to induce in the receiver coil R a voltage signal which is dependent on the electrical characteristics of the adjacent formation material.

In addition to the formation dependent voltage component, there is also induced in the receiver coil R a further voltage component resulting from the direct flux coupling between the transmitter and receiver coils. Consequently, the apparatus of the present embodiment also includes means for cancelling this receiver coil voltage component resulting from direct mutual coupling between the transmitter and receiver coils. This means includes a transformer 21 having a primary winding 22 connected in series in the transmitter energizing current path and a secondary winding 23 connected in series with the receiver coil R. Transformer 21 is connected so that the voltage induced in the secondary winding 23 thereof will be opposite in polarity to the direct coupling voltage component induced in the receiver coil R. The turns ratio for transformer 21 is selected so that this secondary winding voltage is equal in magnitude to the direct coupling voltage component of receiver coil R. Any necessary adjustment of the transformer 21 is conveniently made with the downhole apparatus suspended in air at the surface of the earth and removed from any significant nearby conductive or magnetic bodies. In this case, the only voltage component that will be induced in the receiver coil R is the component resulting from direct flux coupling.

The apparatus of the present invention further includes first phase sensitive circuit means coupled to the coil system 13 for developing a signal representative of the magnitude of a given phase component of the coil system signal. In the present embodiment, this phase sensitive circuit means includes a first phase sensitive detector circuit 24 coupled to the receiver coil R by way of a signal amplifier 25 for developing a signal representative of the magnitude of the receiver coil voltage component which is in phase with the transmitter coil energizing current. Also supplied to the phase sensitive detector 24 is a phase reference signal developed across a resistor 26 which is connected in series in the transmitter current path. Under the control of this phase reference signal, the phase sensitive detector 24 serves to develop a unidirectional or direct-current type of output signal which is proportional to the magnitude of the receiver coil voltage component which is in phase with the transmitter coil current I. It is noted that the phase reference signal developed across resistor 26 is a voltage signal that is in phase with the transmitter coil current I.

The apparatus of the present invention also includes a second phase sensitive circuit means coupled to the coil system 13 for developing a signal representative of the magnitude of a quadrature phase component of the coil system signal. In the present embodiment, this second phase sensitive circuit means includes a phase sensitive detector circuit 27 coupled to the receiver coil R by way of the amplifier 25 for developing a signal representative of the magnitude of the receiver coil voltage component which is in phase quadrature with, that is, 90° out of phase with, the transmitter coil energizing current I. There is also supplied to the phase sensitive detector 27 a phase reference signal developed across an inductor 28 connected in series in the transmitter current path. Under the control of this phase reference signal, the phase sensitive detector 27 serves to develop a unidirectional or direct-current type of output signal which is proportional to the magnitude of the quadrature phase receiver coil voltage component. The inductor 28 is of the high Q type so that the voltage signal developed thereacross is 90° out of phase with the transmitter coil current I.

The apparatus of the present invention further includes means for modifying the in-phase magnitude signal by the quadrature-phase magnitude signal for developing an output signal which provides an improved indication of an electrical characteristic of the adjacent formation material. In the present embodiment, this modifying means includes a signal adding circuit 30 for combining in an additive manner the in-phase and quadrature-phase unidirectional signals appearing at the output terminals of phase sensitive detectors 24 and 27. In the present embodiment, this signal adding circuit 30 is in the form of a resistor adding network and includes resistors 31, 32, and 33. Resistors 31 and 33 have relatively high resistance values while resistor 32 has a relatively low resistance value. This serves to effectively isolate the two output circuits of the phase sensitive detectors from one another. In the present embodiment, the in-phase and quadrature-phase unidirectional signals are intended to be added together in a straight one-for-one fashion with no relative difference in the attenuation of the two signals. Consequently, the resistance values of resistors 31 and 33 are made equal to one another. As will be shown, the resultant output signal developed across resistor 32 is more accurately proportional to the electrical conductivity of the adjacent formation material.

The combined or resultant output signal appearing across resistor 32 is supplied by way of cable conductors 15c and 15d to a recorder 34 located at the surface of the earth. Recorder 34 serves to record this output signal as a function of the depth of the downhole apparatus in the borehole 11. To this end, a mechanical measuring wheel 35 engages the cable 15 and is rotated thereby. This measuring wheel 35 is mechanically linked with the recorder drive mechanism as indicated by dash line 36 so as to advance the recording medium of recorder 34 in synchronism with the movement of the downhole apparatus through the borehole 11.

Considering now the operation of the FIG. 1 apparatus just described as the downhole portion thereof including the coil system 13 and the instrument housing 14 is moved through the borehole 11, the signal generator 20 operates to supply alternating current of constant amplitude and constant frequency to the transmitter coil T. The flow of this current in the windings of the transmitter coil T produces an alternating electromagnetic flux field in the region surrounding such transmitter coil and extending a substantial distance into the adjacent formation material. This alternating flux field, in turn, serves to induce a secondary current flow, commonly referred to as "eddy current," in the adjacent formation material. This induced or secondary current in general flows around the support member 18 in circular loops which are coaxial with the center axis of the transmitter coil T and, hence, generally coaxial with the center axis of the borehole 11. The magnitude of this secondary current flow is dependent on the effective electrical impedance of the adjacent formation material. This current flow generally contains both resistive and reactive components. Where the drilling fluid 12 is of a conductive nature, some secondary current will also flow therein.

The flow of secondary current in the adjacent earth formation material produces an accompanying electromagnetic field which links with the receiver coil R and, hence, serves to induce in such receiver coil a corresponding voltage component which is dependent on the electrical characteristics of the adjacent formation material. There is also induced in the receiver coil R a second voltage component caused by direct flux coupling between the transmitter and receiver coils. This direct coupling voltage component is not dependent on the conductive properties of the adjacent formation material and, consequently, remains substantially constant throughout the course of the investigation.

The relationship between the transmitter coil current I and the total receiver coil voltage V of the FIG. 1 apparatus is described by the following mathematical expression:

$$V = -jwMI \quad (1)$$

where "$j$" denotes the usual vector operator, "$\omega$" denotes the angular frequency ($2\pi f$), and "$M$" denotes the effective mutual inductance between the transmitter and receiver coils.

From electromagnetic field theory and, in particular, from the theory concerning magnetic dipoles, it can be shown for a pair of coaxial coils located in a homogeneous isotropic medium and spaced apart by a distance greater than the coil dimensions that the relationship of Equation 1 may be rewritten as:

$$V = -j\omega I \frac{\mu A_t A_r}{2\pi L^3}(1-j\gamma L)e^{j\gamma L} \quad (2)$$

where $\mu$ = permeability of the medium
$A_t$ = product of cross-sectional area times number of coil turns for transmitter coil
$A_r$ = product of cross-sectional area times number of coil turns for receiver coil
$L$ = spacing between coil centers
$\gamma$ = propagation constant of the medium Where the surrounding medium is of a conductive nature, as in the present case, then the propagation constant $\gamma$ is described by the relationship:

$$\gamma = \sqrt{j\omega\sigma\mu} \quad (3)$$

where "$\sigma$" denotes the electrical conductivity of the medium. Equation 3 can be rewritten as:

$$\gamma = \frac{1+j1}{\delta} \quad (4)$$

where "$\delta$" denotes the "skin depth" in the medium. This skin depth $\delta$ represents the effective depth of penetration of the electromagnetic field and is defined as:

$$\delta = \sqrt{\frac{2}{\omega\sigma\mu}} \quad (5)$$

Note that the skin depth $\delta$ is a function of the formation conductivity $\sigma$ and the operating frequency $\omega$.

Expanding Equation 2 by means of a power series gives the following expression:

$$V = -j\omega I \frac{\mu A_t A_r}{2\pi L^3}\left[1 - \frac{(j\gamma L)^2}{2} - \frac{(j\gamma L)^3}{3} - \frac{(j\gamma L)^4}{8} - \frac{(j\gamma L)^5}{30} - \cdots\right] \quad (6)$$

Substituting the value of $\gamma$ given by Equation 4 into Equation 6 and simplifying gives:

$$V = \frac{-j\omega\mu I A_t A_r}{2\pi L^3}\left[1 + j\left(\frac{L}{\delta}\right)^2 - \frac{2}{3}(1+j)\left(\frac{L}{\delta}\right)^3 + \frac{1}{2}\left(\frac{L}{\delta}\right)^4 - \frac{2}{15}(1-j)\left(\frac{L}{\delta}\right)^5 + \cdots\right] \quad (7)$$

It is seen that Equation 7 contains both real and imaginary terms. Accordingly, Equation 7 is of the form:

$$V = V_r + jV_x \quad (8)$$

$V_r$ denotes the real terms of Equation 7. $V_r$ thus denotes the receiver coil voltage components which are in phase with the transmitter coil energizing current I. These in-phase components result from the resistive component of the formation impedance. $V_x$, on the other hand, corresponds to the imaginary terms of Equation 7 and, consequently, denotes the voltage components induced in the receiver coil R which are 90° out of phase with or, in other words, in phase quadrature with the transmitter coil current I. These quadrature-phase voltage components result from both the direct flux coupling between transmitter receiver coils and from the reactive component of the formation impedance.

Collecting the real terms of Equation 7, is is seen that:

$$V_r = \frac{\omega\mu I A_t A_r}{2\pi L^3}\left[\left(\frac{L}{\delta}\right)^2 - \frac{2}{3}\left(\frac{L}{\delta}\right)^3 + \frac{2}{15}\left(\frac{L}{\delta}\right)^5 - \cdots\right] \quad (9)$$

Factoring out the common $(L/\delta)^2$ term and evaluating the factored $\delta$ by means of Equation 5 gives:

$$V_r = \frac{\sigma\omega^2\mu^2 I A_t A_r}{4\pi L}\left[1 - \frac{2}{3}\left(\frac{L}{\delta}\right) + \frac{2}{15}\left(\frac{L}{\delta}\right)^3 - \cdots\right] \quad (10)$$

The relationship for the resistive or in-phase voltage given by Equation 10 is of the form:

$$V_r = V_g - V_s \quad (11)$$

where $$V_g = \frac{\sigma\omega^2\mu^2 I A_t A_r}{4\pi L} \quad (12)$$

and $$V_s = V_g\left[\frac{2}{3}\left(\frac{L}{\delta}\right) - \frac{2}{15}\left(\frac{L}{\delta}\right)^3 + \cdots\right] \quad (13)$$

The $V_g$ term denotes the so-called "geometrical factor" signal predicted by the linear theory set forth in the previously-mentioned technical paper by Doll. As indicated by Equation 12, the only variable in this case is the formation conductivity factor $\sigma$. Consequently, this geometrical factor signal $V_g$ is directly and linearly proportional to the conductivity $\sigma$ of the adjacent formation material. This is the desired linear output signal.

The remaining terms of Equation 10 represent non-linear in-phase components and are denoted by the symbol $V_s$ as indicated by Equation 13. In other words, $V_s$ denotes the nonlinear or skin effect portion of the in-phase signal $V_r$. It is seen from Equations 11 and 13 that this skin effect term tends to detract from or reduce the total $V_r$ signal in a nonlinear manner relative to the formation conductivity value. In particular, it is noted that the $\delta$ factor is a nonlinear function of conductivity as indicated by Equation 5.

Considering now the reactive or quadrature-phase components of the total signal induced in the receiver coil R, such components are represented by the imaginary terms of Equation 7. Collecting such imaginary terms gives:

$$V_x = \frac{\omega\mu I A_t A_r}{2\pi L^3}\left[-1 + \frac{2}{3}\left(\frac{L}{\delta}\right)^3 - \frac{1}{2}\left(\frac{L}{\delta}\right)^4 + \frac{2}{15}\left(\frac{L}{\delta}\right)^5 - \cdots\right] \quad (14)$$

Equation 14 is of the form:

$$V_x = V_m + V_x' \quad (15)$$

where $$V_m = \frac{-\omega\mu I A_t A_r}{2\pi L_3} \quad (16)$$

and $$V_x' = \frac{\omega\mu I A_t A_r}{2\pi L^3}\left[\frac{2}{3}\left(\frac{L}{\delta}\right)^3 - \frac{1}{2}\left(\frac{L}{\delta}\right)^4 + \frac{2}{15}\left(\frac{L}{\delta}\right)^5 - \cdots\right] \quad (17)$$

The $V_m$ term denotes the voltage component resulting from direct flux coupling between the transmitter and receiver coils. As indicated by Equation 16, this component is not dependent on the conductivity of the adjacent formation material. In the FIG. 1 apparatus, this direct coupling component $V_m$ is cancelled out by an opposite-polarity quadrature-phase voltage provided by the transformer 21. Consequently, this voltage component need not be further considered.

The $V_x'$ term of Equation 15, on the other hand, denotes the quadrature-phase components resulting from the reactive component of the secondary current flow in the adjacent earth formation material. As indicated by the $\delta$ factors of Equation 17, its magnitude is dependent on the conductivity value of the formation material.

Factoring out the common $(L/\delta)^2$ term in Equation 17 and evaluating the factored $\delta$ by means of Equation 5 gives:

$$V_x' = \frac{\sigma\omega^2\mu^2 I A_t A_r}{4\pi L}\left[\frac{2}{3}\left(\frac{L}{\delta}\right) - \frac{1}{2}\left(\frac{L}{\delta}\right)^2 + \frac{2}{15}\left(\frac{L}{\delta}\right)^3 - \cdots\right] \quad (18)$$

Using the relationship of Equation 12 to further simplify Equation 18 gives:

$$V_x' = V_g\left[\frac{2}{3}\left(\frac{L}{\delta}\right) - \frac{1}{2}\left(\frac{L}{\delta}\right)^2 + \frac{2}{15}\left(\frac{L}{\delta}\right)^3 - \cdots\right] \quad (19)$$

A comparison of Equation 19 with Equation 13 shows that:

$$|V_x'| \cong |V_s| \quad (20)$$

In other words, the magnitude of the quadrature-phase component resulting from secondary current flow in the earth formations is approximately equal to the magnitude of the skin effect component of the in-phase signal. This relationship is exactly correct for the first order $L/\delta$ terms of Equations 13 and 19. It has been found that these first order terms actually constitute much the larger portions of the $V_s$ and $V_x'$ components. This results from the fact that the ratio of L to $\delta$ is less than unity for all but extremely high value of formation conductivity. Note that the skin depth $\delta$ is a function of the formation conductivity $\sigma$, as indicated by Equation 5.

Figure 2:
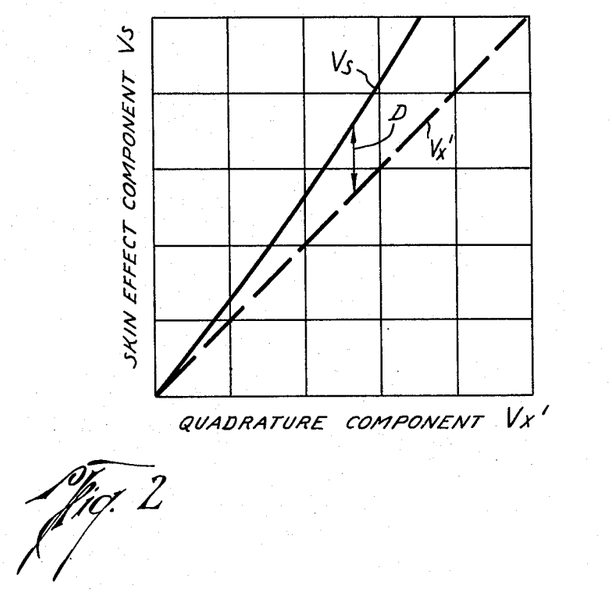
FIG. 2 is a graph used in explaining the FIG. 1 apparatus.

A more precise description of the relationship between the skin effect component $V_s$ and the quadrature-phase component $V_x'$ is given by the graph of FIG. 2. The abscissa axis of FIG. 2 is plotted in a linear manner in terms of the magnitude of the quadrature voltage component $V_x'$ while the ordinate axis is plotted in a linear manner in terms of the skin effect voltage component $V_s$. The $V_x'$ voltage component increases as the formation conductivity $\sigma$ increases. The difference in or lack of equality between the $V_s$ and $V_x'$ components is indicated by the vertical separation D between the $V_s$ and $V_x'$ curves of the FIG. 2. As seen from FIG. 2, this difference D increases as the magnitude of the $V_x'$ component increases and, hence, as the value of the formation conductivity increases.

In order to obtain a better understanding of the situation, it is worthwhile to consider a numerical example. Thus, for an energizing current frequency of 20 kilocycles per second and a formation conductivity of 4,000 millimhos per meter, the skin depth is 70 inches. 4,000 millimhos corresponds to a resistivity of 0.25 ohm-meter. Thus, for formation resistivities greater than 0.25 ohm-meter, the skin depth will be greater than 70 inches. Consequently, if the effective coil spacing is 70 inches or less, then the formation resistivity must decrease to a value of 0.25 ohm-meter or less before a substantial error is present in the desired equality of Equation 20. In terms of conductivity, this means that the conductivity must be 4,000 millimhos per meter or greater. Thus, the higher order terms of Equations 13 and 19 are important only for fairly high values of formation conductivity. Such high values of formation conductivity are not very ofen encountered in practice. Consequently, for many practical purposes, the magnitude of the quadrature-phase $V_x'$ component can be taken as being equal to the magnitude of the in-phase skin effect component $V_s$.

The relationship of Equation 20 indicates a novel manner of correcting for the skin effect error in the total inphase signal $V_r$. As indicated by Equation 11, the skin effect component $V_s$ acts to reduce the magnitude of the total in-phase signal $V_r$ from its desired geometrical factor value $V_g$. If now the magnitude of the in-phase signal is increased by an amount corresponding to the magnitude of the quadrature-phase $V_x'$ component, then this $V_x'$ component, being equal in magnitude to the skin effect component $V_s$ and varying in the same manner with respect to formation conductivity, will serve to offset and cancel the error resulting from the skin effect terms $V_s$. As a result, the corrected in-phase signal $V_r$ will then become equal to the desired geometrical factor signal $V_g$. Consequently, an improved output signal is provided which is more accurately proportional to the electrical conductivity of the adjacent formation material.

This desired result is provided for in the FIG. 1 apparatus by the phase sensitive detectors 24 and 27 and the signal adding circuit 30. The phase sensitive detector 24 serves to develop a unidirectional output signal which is proportional to the magnitude of the total in-phase signal $V_r$, including both the linear term $V_g$ and the skin effect term $V_s$. Phase sensitive detector 27, on the other hand, serves to develop a unidirectional output signal which is proportional to the magnitude of the quadrature-phase $V_x'$ component. The unidirectional output signals from both phase sensitive detectors 24 and 27 are then supplied to the signal adding circuit 30 to develop across the resistor 32 thereof a resultant unidirectional output signal corresponding to the sum of the $V_r$ and $V_x'$ magnitude-representative unidirectional signals. As indicated, this resultant output signal corresponds in magnitude to the desired linear geometrical factor signal $V_g$. Such resultant output signal is then supplied by way of cable conductors 15c and 15d to a recorder 34 located at the surface of the earth. Recorder 34 serves to make a continuous record or log of this output signal as a function of borehole depth. Consequently, there is provided an improved log of the formation conductivity values along the course of the borehole 11.

As indicated, the skin effect correction afforded by making use of the approximate equality between the quadrature-phase component $V_x'$ and the skin effect component $V_s$ will not provide a 100% perfect correction for all possible formation conditions. It will, however, even in extreme cases, provide a substantial improvement over what would be obtained had no correction been made. For example, if the total in-phase signal $V_r$ were in error by a factor of, say, 20%, then a correction which would cut the error in half would reduce the total error to a factor of 10%. This would represent a substantial and worthwhile improvement.

Up to this point, only homogeneous formation conditions have been considered. It has been found, however, that the foregoing analytical relationships also give substantially correct results for non-homogeneous media. In other words, the approximate equality of Equation 20 remains valid for non-homogeneous formation conditions such as where the coil system is in a region containing earth beds or strata having different conductivity values or where the portion of the surrounding bed immediately adjacent the borehole is invaded by the drilling fluid contained in the borehole.

Figure 3:
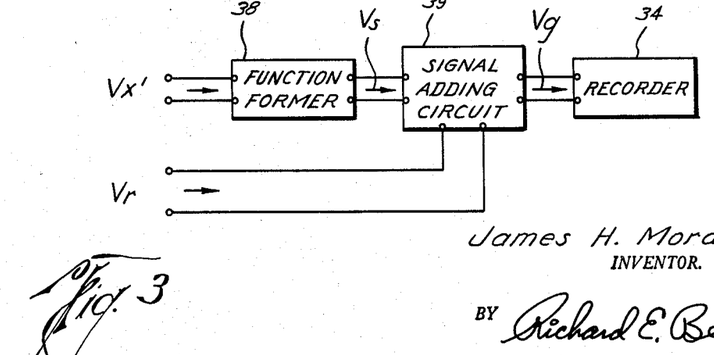
FIG. 3 shows a modified form of a portion of the FIG. 1 apparatus.

In order to insure more nearly perfect skin effect correction, particularly for extreme formation conditions, the apparatus of FIG. 1 may be modified to include the additional apparatus indicated in FIG. 3 of the drawings. The modified apparatus shown in FIG. 3 is preferably located at the surface of the earth. As indicated in FIG. 3, this modified surface apparatus requires that the in-phase signal $V_r$ and the quadrature-phase signal $V_x'$ be supplied to separate input terminals thereof. Consequently, in this case, the resistor adding network 30 would be omitted from the downhole apparatus of FIG. 1 and the output signals from the phase sensitive detectors 24 and 27 would be supplied directly to the surface of the earth by way of separate pairs of cable conductors.

The modified apparatus of FIG. 3 includes means for gradually augmenting the quadrature-phase magnitude signal $V_x'$ in a non-linear manner as its magnitude increases. This means is represented by the function former 38, to which the $V_x'$ signal generated by the downhole apparatus is supplied. This function former 38 serves to increase the magnitude of the quadrature-phase $V_x'$ signal in accordance with the difference between the $V_s$ and $V_x'$ components as indicated by the vertical separation between the curves of FIG. 2. To this end, the function former 38 is provided with a non-linear signal transfer characteristic which serves to increase the signal gain as the magnitude of the input signal increases. Consequently, the function former 38 serves to augment the magnitude of the $V_x'$ signal so as to render such signal substantially equal to the skin effect component $V_s$, even for extremely high values of formation conductivity. As a result, the altered $V_x'$ signal appearing at the output of the function former 38 is, in effect, the skin effect component $V_s$. This skin effect representative signal $V_s$ is then supplied to a signal adding circuit 39 to which is also supplied the in-phase signal $V_r$. Adding circuit 39 serves to add the $V_s$ component from the function former 38 to the total $V_r$ signal to compensate for the reduction of such $V_r$ signal originally caused by the existence of such skin effect component in the $V_r$ signal. The corrected signal appearing at the output of signal adding circuit 39 thus corresponds to the desired linear geometrical factor signal $V_g$. This linear signal $V_g$ is then supplied to the recorder 34 to provide the desired record or log of the formation conductivity values.

Function former 38, is, for example, a function former of the diode type as described on pages 290–299 of the text entitled Electronic Analog Computers, by Korn and Korn, 2nd Edition, published by McGraw-Hill Book Company in 1956. Other known types of function formers may instead be utilized. The signal adding circuit 39 may take the form of a resistor adding network of the type shown in FIG. 1.

Figure 4:
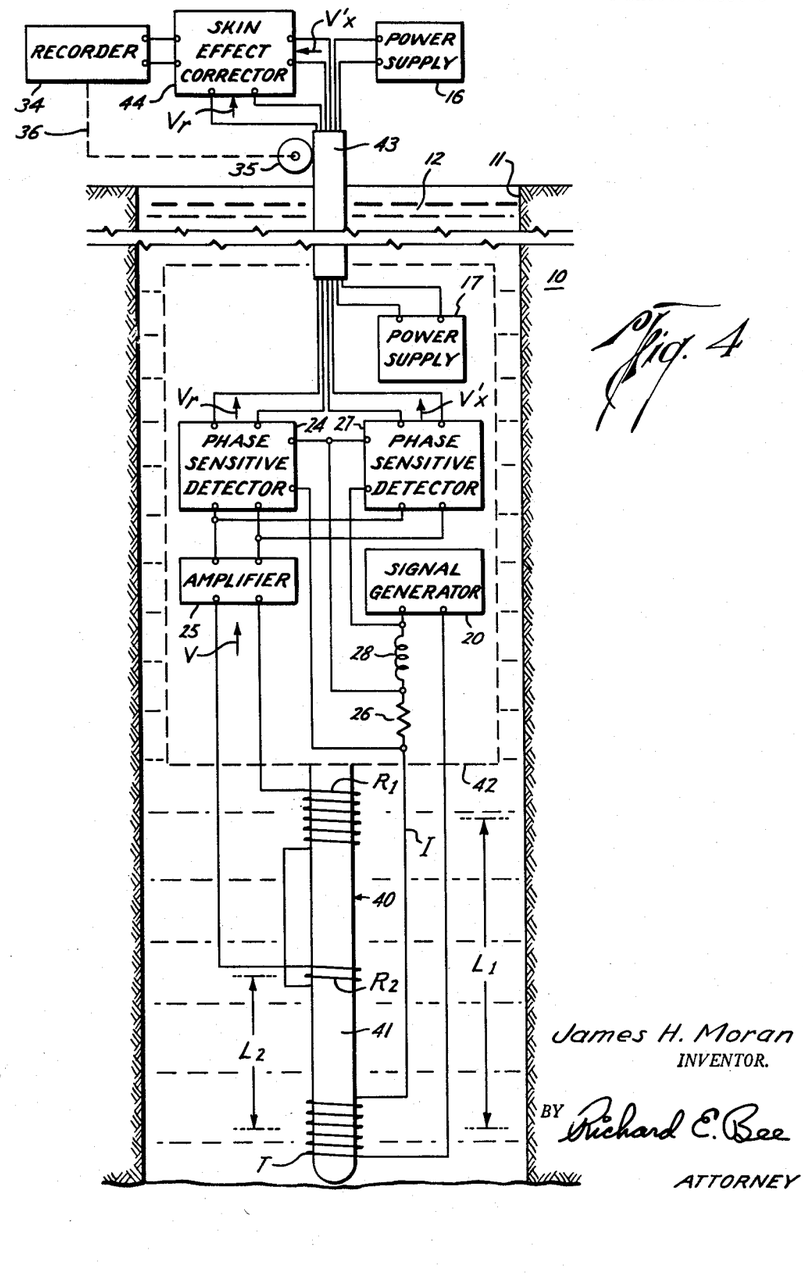
FIG. 4 illustrates a further embodiment of induction logging apparatus.

Referring now to FIG. 4 of the drawings, there is illustrated a further embodiment of induction logging apparatus constructed in accordance with the present invention. Portions of the FIG. 4 apparatus are the same as portions of the FIG. 1 apparatus and, consequently, are designated by the same reference numerals. The downhole portion of the FIG. 4 apparatus includes a modified form of coil system 40 comprising a transmitter coil T and two receiver coils $R_1$ and $R_2$, all coils being wound around a nonconductive, nonmagnetic support member 41. The additional receiver coil $R_2$ is coupled in a series opposing manner with the receiver coil $R_1$. The spacing between the longitudinal midpoints of the transmitter coil T and the first receiver coil $R_1$ is designated by the dimension $L_1$. Similarly, the spacing between transmitter coil T and the second receiver coil $R_2$ is designated by the dimension $L_2$.

The upper end of the support member 41 is mechanically attached to a fluid-tight instrument housing 42 containing a modified combination of electrical circuits. In particular, the transformer 21 and the signal adding circuit 30 of FIG. 1 have been omitted from the instrument housing 42 of FIG. 4. The upper end of the instrument housing 42 is suspended from the surface of the earth by way of an armored multi-conductor cable 43 which, in the present embodiment, contains at least three pairs of insulated conductors. In the present embodiment, the signal modifying means for modifying the in-phase $V_r$ signal by the quadrature-phase $V_x'$ signal is represented by a skin effect corrector 44 located at the surface of the earth. This skin effect corrector 44 may take the form of either the resistor adding network 30 of FIG. 1 or the combination of function former plus signal adding circuit shown in FIG. 3, the choice depending on the formation conditions to be encountered and the degree of accuracy required.

Considering now the operation of the FIG. 4 apparatus, as the downhole portion thereof is moved through the borehole 11, signal generator 20 operates to supply alternating current of constant amplitude and constant frequency to the transmitter coil T. The resulting current flow in the adjacent formation material serves to induce formation dependent voltage components in both of the receiver coils $R_1$ and $R_2$. The direct flux coupling between the transmitter coil T and the receiver coils $R_1$ and $R_2$ also induces voltage components in the receiver coils $R_1$ and $R_2$. In this embodiment, however, the direct coupling component induced in receiver coil $R_1$ is cancelled by the opposite-polarity direct coupling component induced in receiver coil $R_2$, this cancellation being provided by the series opposing connection of these coils. Both the number of turns and the location of the coil $R_2$ are chosen to accomplish this result. A further benefit occurs in the case of the FIG. 4 coil system in that the remaining voltage components induced in receiver coil $R_2$ serve to cancel voltage components induced in the receiver coil $R_1$ which are caused primarily by the secondary current flow in the drilling mud 12 contained in the borehole 11.

The total or net in-phase voltage appearing across the two series-connected receiver coils $R_1$ and $R_2$ may be determined by algebraically summing the individual in-phase voltage components induced in the two receiver coils. In other words:

$$(V_r)_{total} = \pm(V_r)_1 \pm (V_r)_2 \pm \ldots \quad (21)$$

where $(V_r)_1$ = in-phase voltage induced in receiver coil $R_1$
$(V_r)_2$ = in-phase voltage induced in receiver coil $R_2$ The polarity of the individual terms depends on the relative polarity of the transmitter-receiver coil combination producing that term. Assuming that transmitter coil T and receiver coil $R_1$ are of positive polarity while receiver coil $R_2$ is of negative polarity, then the first term of Equation 21, which results from the combination of transmitter coil T and receiver coil $R_1$, would be of positive polarity while the second term, corresponding to the combination of transmitter coil T and receiver coil $R_2$, would be of negative polarity. It is seen that this type of explanation may be extended to cover more complex coil systems having any desired number of transmitter and receiver coils. In other words, Equation 21 is intended to apply to multicoil systems in general and not to just the specific three coil system of FIG. 4.

Evaluating the individual terms of Equation 21 by means of the in-phase voltage-current relationship of Equation 10 and simplifying gives:

$$(V_r)_{total} = (V_g)_{total} \left[ 1 - \frac{2}{3}\frac{L'}{\delta} + \frac{2}{15}\frac{L'''}{\delta^3} - \ldots \right] \quad (22)$$

In Equation 22:

$$(V_g)_{total} = \frac{\sigma\omega^2\mu^2 I}{4\pi} \sum \left(\frac{A_t A_r}{L}\right) \quad (23)$$

where the summation factor indicates the sum of the corresponding terms for each possible transmitter-receiver coil pair. Equation 23 denotes the general form of the linear geometrical factor signal for coil systems having any number of transmitter and receiver coils. For the specific case of the three coil system of FIG. 4, the summation factor of Equation 23 is:

$$\sum\left(\frac{A_t A_r}{L}\right) = \frac{A_t A_{r1}}{L_1} - \frac{A_t A_{r2}}{L_2} \quad (24)$$

The $L'$ term of Equation 22 is described by the relationship:

$$L' = \frac{\sum(A_t A_r)}{\sum\left(\frac{A_t A_r}{L}\right)} \quad (25)$$

Again, the summation factors represent the sum of the corresponding terms for each possible transmitter-receiver coil pair. Physically the factor $L'$ represents the mean first power of the effective coil system length. It is determined by the physical construction of the coil system and the relative coil polarities.

Similarly, the factor $L''$ is described by the relationship:

$$L'' = \frac{\sum(A_t A_r)L}{\sum\left(\frac{A_t A_r}{L}\right)} \quad (26)$$

$L''$ denotes the mean second power of the effective coil system length. The factor $L'''$ is described by the expression:

$$L''' = \frac{\sum(A_t A_r)L^2}{\sum\left(\frac{A_t A_r}{L}\right)} \quad (27)$$

and denotes the mean third power of the effective coil system length.

The total or net quadrature-phase voltage component appearing across the series-connected receiver coils of a complex coil system is described by the algebraic sum of the quadrature-phase voltage components induced in the individual receiver coils. In other words:

$$(V_x)_{total} = \pm(V_x)_1 \pm (V_x)_2 \pm \ldots \quad (28)$$

As stated, the coil system is constructed so that the quadrature-phase components resulting from direct flux coupling add up to an algebraic sum of zero. Accordingly, only the quadrature-phase components resulting from secondary current flow in the adjacent formation material need be considered. Thus, Equation 28 becomes:

$$(V_x')_{total} = \pm(V_x')_1 \pm (V_x')_2 \pm \ldots \quad (29)$$

Evaluating the individual terms of Equation 29 by the relationship of Equation 18, collecting similar terms, and simplifying gives:

$$(V'_x)_{total} = (V_g)_{total}\left[\frac{2}{3}\frac{L'}{\delta} - \frac{1}{2}\frac{L''}{\delta^2} + \frac{2}{15}\frac{L'''}{\delta^3} - \ldots\right] \quad (30)$$

Comparing Equation 30 with Equation 22 shows that:

$$(V_x')_{total} \cong (V_s)_{total} \quad (31)$$

In other words, the magnitude of the net quadrature-phase voltage component resulting from secondary current flow in the earth formations is very nearly equal to the magnitude of the net skin effect component of the in-phase signal for a complex multi-coil system in the same manner that was true for the two-coil system of FIG. 1. Consequently, the magnitude error in the in-phase signal can be corrected by adding to such signal a signal having a magnitude corresponding to the magnitude of the formation-dependent quadrature-phase component $V_x'$. As before, these analytical relationships were derived for the case of homogeneous formations. It has been found, however, that the resulting correlation between the $V_x'$ and $V_s$ components also remains valid for non-homogeneous formations.

As in FIG. 1, the phase sensitive detectors 24 and 27 of FIG. 4 serve to develop unidirectional output signals corresponding to the magnitudes of the $V_r$ in-phase component and the $V_x'$ quadrature-phase component, respectively. These unidirectional signals are then supplied to the surface of the earth by way of separate pairs of conductors in the cable 43. At the surface, these individual signals are supplied to separate input terminals of the skin effect corrector 44. Skin effect corrector 44 then operates to combine these two unidirectional signals to provide a resultant output signal wherein the skin effect nonlinearities have been corrected. This corrected output signal is then recorded by the recorder 34 as a function of the depth of the downhole apparatus in the borehole.

Figure 5:
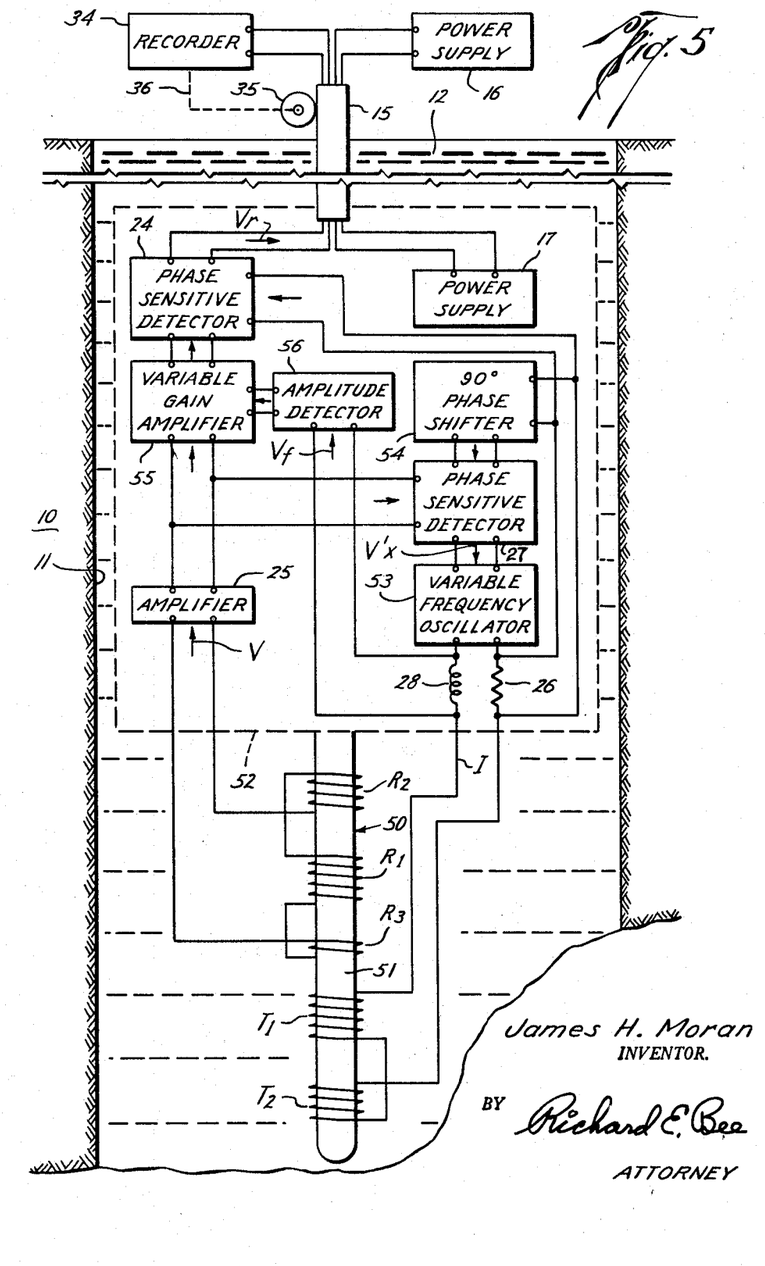
FIG. 5 shows another embodiment of induction logging apparatus constructed in accordance with the principles of the present invention.

Referring now to FIG. 5 of the drawings, there is shown another embodiment of induction logging apparatus constructed in accordance with the present invention. In the FIG. 5 embodiment, the signal representative of the quadrature-phase component $V_x'$ is used in a more indirect manner to correct for the skin effect error in the in-phase $V_r$ signal. In particular, the quadrature-phase $V_x'$ signal is used to modify the coil system operation so as to reduce the occurrence of the skin effect phenomena and thus improve the accuracy of the in-phase signal.

Considering the apparatus of FIG. 5 in greater detail, a coil system 50 of a more complex type is shown. This coil system 50 includes transmitter coils $T_1$ and $T_2$ and receiver coils $R_1$, $R_2$, and $R_3$, each of which is wound around a nonconductive nonmagnetic support member 51. This support member 51 is, in turn, secured to a fluid-tight instrument housing 52. Transmitter coil $T_2$ is connected in a series-opposing manner with the transmitter coil $T_1$, while each of the receiver coils $R_2$ and $R_3$ is connected in a series-opposing manner with respect to the receiver coil, $R_1$. The use of the additional coils in the coil system 50 serves to provide a so-called "vertical focusing" action which limits the effective response of the coil system to the formation region directly opposite the coil system. As before, the polarity, location and number of turns of the coils are selected to provide cancellation of voltage components resulting from direct flux coupling between transmitter and receiver coils.

In the present embodiment, the series-connected transmitter coils $T_1$ and $T_2$ are energized by alternating current supplied by a variable frequency oscillator 53. Oscillator 53 is constructed so that the amplitude of the energizing current remains constant as the frequency varies. The net formation-dependent voltage induced across the series-connected receiver coils $R_1$, $R_2$, and $R_3$ is supplied by way of the amplifier 25 to the phase sensitive detectors 24 and 27. As before, the phase sensitive detector 24 serves to develop a unidirectional output signal representative of the in-phase component $V_r$ of the total receiver coil signal V. To this end, a phase reference signal developed across the resistor 26 is also supplied to the phase sensitive detector 24. Phase sensitive detector 27, on the other hand, serves to develop a unidirectional output signal which is proportional to the formation-dependent quadrature-phase component $V_x'$ of the total receiver coil signal V. The phase reference signal for the detector 27 is developed in a slightly different manner than in previous embodiments. In particular, this phase reference signal is developed by taking the in-phase reference voltage developed across resistor 26, passing it through a 90° phase shift circuit 54 and then supplying it to the phase sensitive detector 27.

In order to minimize the magnitude of the skin effect phenomena, the quadrature-phase $V_x'$ signal developed by the phase sensitive detector 27 is supplied back to the variable frequency oscillator 53 to control the frequency of oscillation thereof in an inverse manner with respect to the magnitude of the $V_x'$ signal. Rewriting the $V_s$ component of Equation 22 in the form:

$$V_s = k\sigma\omega^2\left[\frac{2}{3}\left(\frac{L'\sqrt{\omega\sigma\mu}}{\sqrt{2}}\right) - \cdots\right] \quad (32)$$

where "k" denotes the non-pertinent constant factors, it is seen that the skin effect component $V_s$ is dependent on the frequency of the transmitter coil energizing current. In particular and, for sake of simplicity, considering only the first order terms, it is seen that the fractional signal loss for the in-phase signal $V_r$ which is caused by skin effect is described by the relationship:

$$\frac{V_s}{V_g} \cong k'\sqrt{\omega\sigma} \quad (33)$$

where $k'$ denotes the appropriate constant factors. Thus, it is seen that the signal loss caused by the occurrence of skin effect can be minimized by reducing the operating frequency $\omega$ of the coil system.

Rewriting Equation 30 in the form:

$$V_x' = k\sigma\omega^2\left[\frac{2}{3}\frac{L'\sqrt{\omega\sigma\mu}}{\sqrt{2}} - \cdots\right] \quad (34)$$

shows that the quadrature-phase component $V_x'$ is frequency dependent in substantially the same manner as is the skin effect component $V_s$. Consequently, using the $V_x'$ signal to control the operating frequency to minimize such $V_x'$ signal also serves to correspondingly minimize the skin effect component $V_s$. In the present embodiment, this is done by feeding the $V_x'$ signal back to the variable frequency oscillator 53 in a degenerative manner so that the resulting feedback loop for the $V_x'$ component serves to hold this component to a desired minimum value. The gain factors and bias levels in this feedback loop are, of course, selected in accordance with the desired degree of accuracy.

As a consequence of minimizing the skin effect component $V_s$ by varying the frequency of the transmitter coil energizing current, the resulting in-phase component $V_r$ developed across the receiver coils is more or less free of such undesired skin effect component and, hence, more nearly equal to the desired linear geometrical factor component $V_g$. The fact that the transmitter coil operating frequency is varied, however, also produces a frequency-dependent variation in the magnitude of the in-phase component $V_r$. Assuming that the skin effect component $V_s$ has been reduced to a negligible value then this frequency variation in the $V_r$ signal is indicated by the frequency factor $\omega$ of Equation 23.

The present embodiment includes circuit means for eliminating this frequency variation in the $V_r$ signal by adjusting the magnitude of the $V_r$ signal inversely with respect to the oscillator frequency. This circuit means includes a variable gain amplifier 55 together with circuit means for providing a control signal proportional to the oscillator frequency. This later circuit means is represented by an amplitude detector 56 together with the inductor 28 connected in series with the transmitter coils. In particular, the magnitude of the voltage reference signal $V_f$ developed across the inductor 28 is proportional to the frequency of the oscillator current supplied to the transmitter coils as indicated by the following relationship:

$$V_1 = \omega L_0 I \quad (35)$$

where $L_0$ denotes the inductance of inductor 28. The amplitude detector 56 then serves to detect the magnitude of this reference voltage $V_f$ to provide a unidirectional output signal corresponding in magnitude to the oscillator frequency. As indicated by Equation 23, the variation which it is desired to eliminate is of a square-law nature. This may readily be taken into account by using a square-law type of detector for the amplitude detector 56. The unidirectional control signal from the amplitude detector 56 is then used to control the signal gain of the variable gain amplifier 55 inversely with respect to the oscillator frequency so as to eliminate the frequency dependent variation from the in-phase signal component $V_r$. The resulting output signal from the variable gain amplifier 55 is then supplied to the phase sensitive detector 24 to provide the desired unidirectional $V_r$ signal which is transmitted up the cable 15 to the recorder 34 located at the surface of the earth. Consequently, there is provided on the recorder 34 a record or log of the formation conductivity values which contains a minimum of error due to the occurrence of electrical skin effect phenomena.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of investigating subsurface formation material adjacent a borehole drilled into the earth comprising: inducing a flow of alternating current in the formation material; obtaining an indication of the magnitude of a first phase component of the electromagnetic field produced by this current flow; obtaining an indication of the magnitude of a second phase component of this electromagnetic field which is in phase quadrature with the first phase component; and modifying the first magnitude indication by the second magnitude indication to provide a more accurate indication of an electrical characteristic of the formation material.

2. A method of investigating subsurface formation material adjacent a borehole drilled into the earth comprising: inducing a flow of alternating current in the formation material; obtaining an indication of the magnitude of a first phase component of the electromagnetic field produced by this current flow; obtaining an indication of the magnitude of a second phase component of the electromagnetic field which is in phase quadrature with the first phase component; and adding the second magnitude indication to the first magnitude indication to provide a more accurate indication of an electrical characteristic of the formation material.

3. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first phase sensitive circuit means coupled to the coil system for developing a signal representative of the magnitude of a first phase component of the coil system signal; second phase sensitive circuit means coupled to the coil system for developing a signal representative of the magnitude of a second phase component of the coil system signal which is in phase quadrature with the first phase component; and means for modifying the first magnitude signal by the second magnitude signal for developing an output signal which provides a more accurate indication of an electrical characteristic of the adjacent formation material.

4. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first phase sensitive circuit means coupled to the coil system for developing a signal representative of the magnitude of the coil system signal component which is in phase with the energizing current; second phase sensitive circuit means coupled to the coil system for developing a signal representative of the magnitude of the coil system signal component which is in phase quadrature with the energizing current; and means for modifying the in-phase signal by the quadrature-phase signal for developing an output signal which provides an improved indication of an electrical characteristic of the adjacent formation material.

5. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; first phase sensitive circuit means coupled to the receiver coil for developing a signal representative of the magnitude of the receiver coil voltage component which is in phase with the transmitter coil current; second phase sensitive circuit means coupled to the receiver coil for developing a signal representative of the magnitude of the receiver coil voltage component which is in phase quadrature with the transmitter coil current; and means for modifying the in-phase signal by the quadrature-phase signal for developing an output signal which is more accurately proportional to the electrical conductivity of the adjacent formation material.

6. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; means for cancelling receiver coil voltage components resulting from direct flux coupling between transmitter and receiver coils; first phase sensitive circuit means coupled to the receiver coil for developing a signal representative of the magnitude of the receiver coil voltage component which is in phase with the transmitter coil current; second phase sensitive circuit means coupled to the receiver coil for developing a signal representative of the magnitude of the remaining receiver coil voltage component which is in phase quadrature with the transmitter coil current; and means for modifying the in-phase signal by the quadrature-phase signal for developing an output signal which is more accurately proportional to the electrical conductivity of the adjacent formation material.

7. In induction logging apparatus for investigating earth formation traversed by a borehole, the combination comprising: a coil system adapted for movement through the borehole and including a transmitter coil, a receiver coil, and at least one additional coil coupled in series opposition with one of these coils; means for energizing the transmitter coils with alternating current to develop across the receiver coils a net voltage signal which is dependent on the electrical characteristics of the adjacent formation material, the series-opposing coils providing cancellation of voltage components resulting from direct flux coupling between transmitter and receiver coils; first phase sensitive circuit means coupled to the receiver coils for developing a signal representative of the magnitude of the net receiver coil voltage component which is in phase with the transmitter coil current; second phase sensitive circuit means coupled to the receiver coils for developing a signal representative of the magnitude of the net receiver coil voltage component which is in phase quadrature with the transmitter coil current; and means for modifying the in-phase signal by the quadrature-phase signal for developing an output signal which is more accurately proportional to the electrical conductivity of the adjacent formation material.

8. In induction logging apparatus for investigating earth formation traversed by a borehole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; a first phase sensitive detector circuit coupled to the receiver coil for developing a unidirectional signal proportional to the magnitude of the receiver coil voltage component which is in phase with the transmitter coil current; a second phase sensitive detector circuit coupled to the receiver coil for developing a unidirectional signal proportional to the magnitude of the receiver coil voltage component which is in phase quadrature with the transmitter coil current; and means for modifying the in-phase unidirectional signal by the quadrature-phase unidirectional signal for developing an output signal which is more accurately proportional to the electrical conductivity of the adjacent formation material.

9. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; first phase sensitive circuit means coupled to the receiver coil for developing a signal representative of the magnitude of the receiver coil voltage component which is in phase with the transmitter coil current; second phase sensitive circuit means coupled to the receiver coil for developing a signal representative of the magnitude of the receiver coil voltage component which is in phase quadrature with the transmitter coil current; and means for combining the in-phase signal with the quadrature-phase signal for developing a resultant output signal which is more accurately proportional to the electrical conductivity of the adjacent formation material.

10. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; first phase sensitive circuit means coupled to the receiver coil for developing a signal representative of the magnitude of the receiver coil voltage component which is in phase with the transmitter coil current; second phase sensitive circuit means coupled to the receiver coil for developing a signal representative of the magnitude of the receiver coil voltage component which is in phase quadrature with the transmitter coil current; and means for adding the quadrature-phase signal to the in-phase signal for developing a resultant output signal which is more accurately proportional to the electrical conductivity of the adjacent formation material 11. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; first phase sensitive circuit means coupled to the receiver coil for developing a signal representative of the magnitude of the receiver coil voltage component which is in phase with the transmitter coil current; second phase sensitive circuit means coupled to the receiver coil for developing a signal representative of the magnitude of the receiver coil voltage component which is in phase quadrature with the transmitter coil current; and a signal adding circuit for adding the quadrature-phase signal to the in-phase signal for developing a resultant output signal which is more accurately proportional to the electrical conductivity of the adjacent formation material.

12. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; first phase sensitive circuit means coupled to the receiver coil for developing a signal representative of the magnitude of the receiver coil voltage component which is in phase with the transmitter coil current; second phase sensitive circuit means coupled to the receiver coil for developing a signal representative of the magnitude of the receiver coil voltage component which is in phase quadrature with the transmitter coil current; means for modifying the in-phase signal by the quadrature-phase signal for developing an output signal which is more accurately proportional to the electrical conductivity of the adjacent formation material; and means for recording this output signal as a function of depth in the borehole.

13. In induction logging apparatus for investigating earth formations traversed by a bore hole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; means for cancelling receiver coil voltage components resulting from direct flux coupling between transmitter and receiver coils; a first phase sensitive detector circuit coupled to the receiver coil for developing a unidirectional signal proportional to the magnitude of the receiver coil voltage component which is in phase with the transmitter coil current; a second phase sensitive detector circuit coupled to the receiver coil for developing a unidirectional signal proportional to the magnitude of the remaining receiver coil voltage component which is in phase quadrature with the transmitter coil current; a signal adding circuit for adding the quadrature-phase unidirectional signal to the in-phase unidirectional signal for developing a resultant output signal which is more accurately proportional to the electrical conductivity of the adjacent formation material; and means for recording this output signal as a function of borehole depth.

14. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first phase sensitive circuit means coupled to the coil system for developing a signal representative of the magnitude of a first phase component of the coil system signal; second phase sensitive circuit means coupled to the coil system for developing a signal representative of the magnitude of a second phase component of the coil system signal which is in phase quadrature with the first phase component; means for altering the magnitude of the second magnitude signal as a function of its magnitude; and means for modifying the first magnitude signal by the altered second signal for developing an output signal which provides an improved indication of an electrical characteristic of the adjacent formation material.

15. In induction logging apparatus for investigating earth formation traversed by a borehole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; first phase sensitive circuit means coupled to the receiver coil for developing a signal representative of the magnitude of the receiver coil voltage component which is in phase with the transmitter coil current; second phase sensitive circuit means coupled to the receiver coil for developing a signal representative of the magnitude of the receiver coil voltage component which is in phase-quadrature with the transmitter coil current; means for gradually augmenting the magnitude of the quadrature-phase magnitude signal in a nonlinear manner as its magnitude increases; and means for adding the augmented quadrature-phase signal to the in-phase magnitude signal for developing a resultant output signal which is more accurately proportional to the electrical conductivity of the adjacent formation material.

16. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first phase sensitive circuit means coupled to the coil system for developing a signal representative of the magnitude of a given phase component of the coil system signal; second phase sensitive circuit means coupled to the coil system for developing a signal representative of the magnitude of a quadrature phase component of the coil system signal; means for altering an electrical characteristic of the coil system energizing current as a function of the magnitude of the quadrature-phase signal; and means for recording the given-phase magnitude signal as a function of borehole depth.

17. In induction logging apparatus for investigating earth formations traversed by a borehole, the combination comprising: a coil system adapted for movement through the borehole and including at least one transmitter coil and at least one receiver coil; means for energizing the transmitter coil with alternating current to induce in the receiver coil a voltage signal which is dependent on the electrical characteristics of the adjacent formation material; first phase sensitive circuit means coupled to the receiver coil for developing a signal representative of the magnitude of the receiver coil voltage component which is in phase with the transmitted coil current; second phase sensitive circuit means coupled to the receiver coil for developing a signal representative of the magnitude of the receiver coil voltage component which is in phase quadrature with the transmitter coil current; means for altering the frequency of the transmitter coil current as a function of the magnitude of the quadrature-phase signal; and means for recording the in-phase magnitude signal as a function of borehole depth.

18. In induction logging apparatus for investigating earth formation traversed by a borehole, the combination comprising: a coil system adapted for movement through the borehole and including at least one transmitter coil and at least one receiver coil; a variable frequency oscillator for enerizing the transmitted coil with alternating current to induce in the receiver coil a voltage signal which is dependent on the electrical characteristics of the adjacent formation material; a first phase sensitive detector coupled to the receiver coil for developing a signal representative of the magnitude of the receiver coil voltage component which is in phase with the transmitter coil current; a second phase sensitive detector coupled to the receiver coil for developing a signal representative of the magnitude of the receiver coil voltage component which is in phase-quadrature with the transmitter coil current; circuit means responsive to the quadrature-phase magnitude signal for varying the oscillator frequency so as to minimize such signal; circuit means for adjusting the magnitude of the in-phase magnitude signal inversely with respect to the oscillator frequency; and means for recording the adjusted in-phase magnitude signal as a function of borehole depth.

19. In induction logging apparatus for investigating earth formations traversed by a borehole, the combination comprising: a coil system adapted for movement through the borehole, means for energizing the coil system with alternating current to develop a signal which is dependent on the electrical characteristics of the adjacent formation material; first circuit means coupled to the coil system for developing a signal representative of a first phase component of the coil system signal; second circuit means coupled to the coil system for developing a signal representative of a second phase component of the coil system signal which is in phase quadrature with the first phase component; and means for modifying the first phase signal by the second phase signal for developing an output signal which provides an improved indication of an electrical characteristic of the adjacent formation material.

20. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first circuit means coupled to the coil system for developing a signal representative of a first phase component of the coil system signal; second circuit means coupled to the coil system for developing a signal representative of a second phase component of the coil system signal which is in phase quadrature with the first phase component; and means for modifying the first signal as a function of the second signal for developing an output signal which provides an improved indication of an electrical characteristic of the adjacent formation material.

21. In induction logging apparatus for investigating earth formations traversed by a borehole, the combination comprising: a coil system adapted for movement through the borehole; means for energizing the coil system with alternating current to develop a signal which is dependent on the electrical characteristics of the adjacent formation material; first phase sensitive circuit means coupled to the coil system for developing a signal representative of the magnitude of a first phase component of the coil system signal; second phase sensitive circuit means coupled to the coil system for developing a signal representative of the magnitude of a second phase component of the coil system signal which is in phase quadrature with the first phase component; and means responsive to the second magnitude signal for producing a modification of the first magnitude signal as a function of the magnitude of the second signal for developing an output signal which provides an improved indication of an electrical characteristic of the adjacent formation material.

References Cited in the file of this patent
UNITED STATES PATENTS

| | | |
|---|---|---|
| 2,220,070 | Aiken | Nov. 5, 1940 |
| 2,731,596 | Wait et al. | Jan. 17, 1956 |
| 2,788,483 | Doll | Apr. 9, 1957 |
| 2,887,650 | Ruddock et al. | May 19, 1959 |
| 2,948,846 | Coufleau | Aug. 9, 1960 |